W. V. TURNER.
FLUID PRESSURE BRAKE.
APPLICATION FILED APR. 3, 1915.

1,162,826.

Patented Dec. 7, 1915.
2 SHEETS—SHEET 1.

WITNESSES
H. W. Crowell
A. M. Clements.

INVENTOR
Walter V. Turner
by Wm. M. Cady
Att'y.

W. V. TURNER.
FLUID PRESSURE BRAKE.
APPLICATION FILED APR. 3, 1915.
1,162,826.
Patented Dec. 7, 1915.
2 SHEETS—SHEET 2.
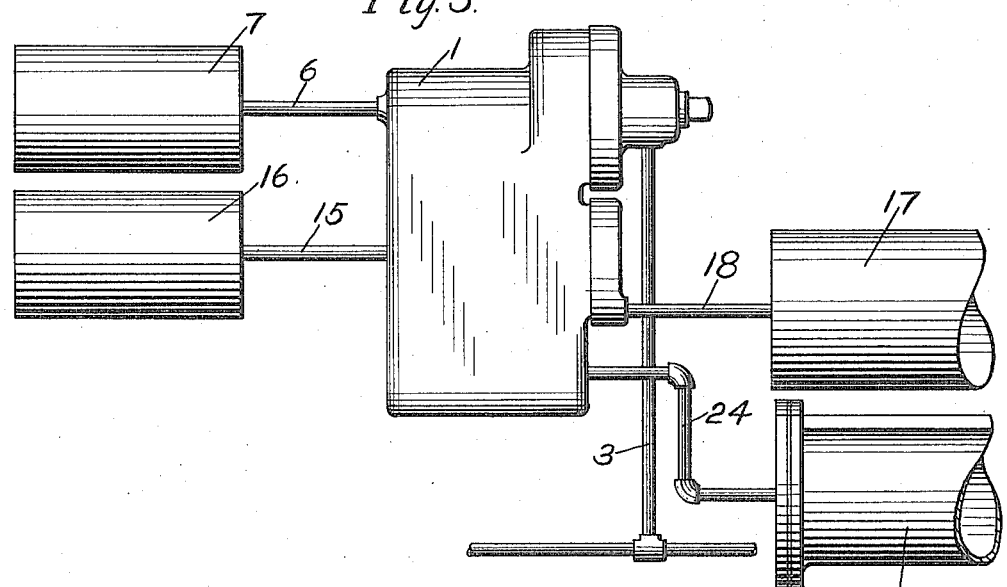
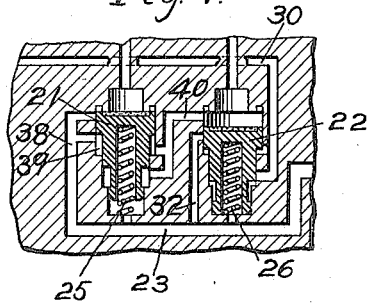

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,162,826.     Specification of Letters Patent.     Patented Dec. 7, 1915.

Application filed April 3, 1915. Serial No. 18,913.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes and has for its principal object to provide a brake controlling valve device having improved means for securing a high degree of pressure in the brake cylinder in an emergency application of the brakes.

In my prior Patent No. 1,078,016, granted November 11, 1913, a high brake cylinder pressure is obtained by providing two sources of fluid under pressure and means for first effecting the equalization of one source into the brake cylinder in an emergency application of the brakes and then adapted to cut off communication between said source and the brake cylinder and permit the equalization of the other source of pressure into the brake cylinder.

According to my present invention three sources of fluid under pressure are provided, together with means for effecting the successive and independent equalization of the several sources of pressure into the brake cylinder. By this means a still higher degree of pressure is obtained in the brake cylinder for a given pressure carried in the brake system.

Figure 1:
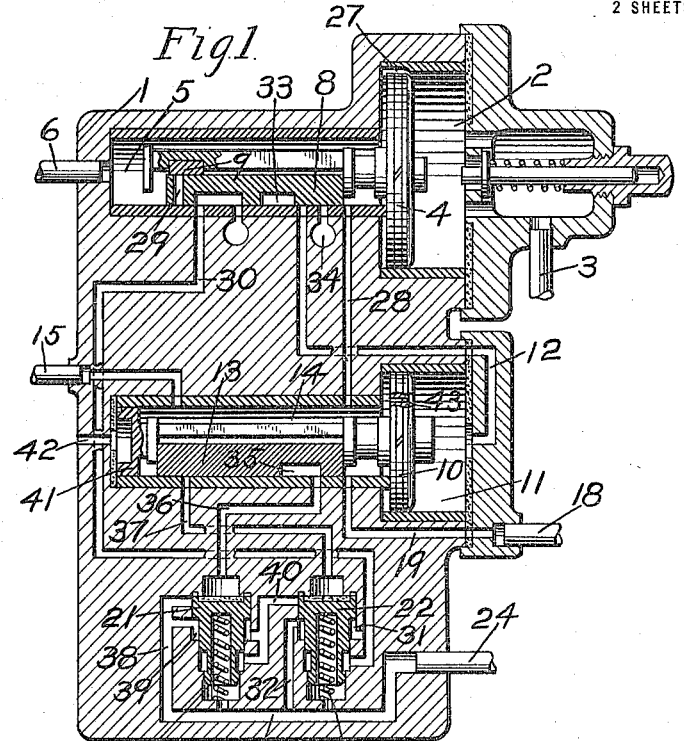
Figure 2:
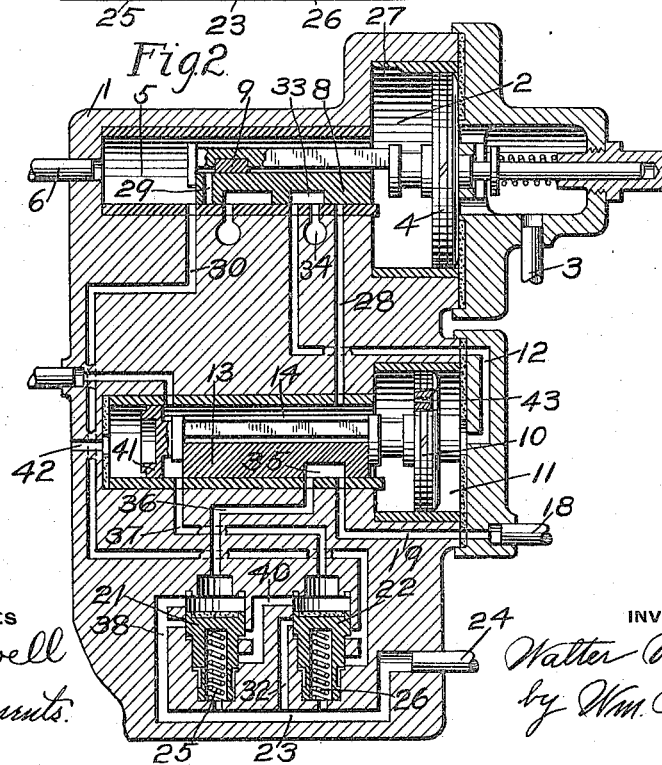

In the accompanying drawings, Figure 1 is a central sectional view of a brake controlling valve device embodying my invention, and showing the parts in normal release position; Fig. 2 a similar view, showing the parts in the initial positions assumed, when an emergency application of the brakes is made; Fig. 3 a diagrammatic view of a car air brake equipment including the improved brake controlling valve device; and Fig. 4 a fragmentary sectional view of the intercepting valve mechanism in position for the second stage equalization into the brake cylinder.

The brake controlling valve device 1 may comprise a casing having a piston chamber 2 connected to brake pipe 3 and containing equalizing piston 4 and having a valve chamber 5 connected by pipe 6 with an auxiliary reservoir 7 and containing a main slide valve 8 and an auxiliary graduating valve 9.

The above described equalizing valve device controls an emergency valve mechanism comprising a piston 10 contained in piston chamber 11 having a passage 12 leading to the seat of the main slide valve 8, said piston being adapted to operate a slide valve 13 contained in valve chamber 14 which is open through a pipe 15 to a reservoir 16. In the release position of the emergency slide valve 13, a reservoir 17 is also connected to valve chamber 14 through pipe 18 and passage 19.

In an emergency application of the brakes, communication from the three reservoirs 7, 16, and 17 to the brake cylinder 20 is controlled by differential valve pistons 21 and 22, through passage 23 and pipe 24, said valve pistons being normally maintained at their respective upper seats by springs 25 and 26. When the brake pipe 3 is charged with fluid under pressure, air flows through the usual feed groove 27 around the equalizing piston 4 and charges the valve chamber 5 and the auxiliary reservoir 7. Fluid under pressure also flows from valve chamber 5 through a passage 28 to valve chamber 14 and hence the reservoirs 16 and 17 become charged.

If a service application of the brakes is desired, a gradual reduction in brake pipe pressure is made, and the equalizing piston 4 is thereupon moved to service application position, in which the service port 29 registers with a passage 30. Fluid can then flow to the brake cylinder from the auxiliary reservoir 7 through passage 30 and an annular chamber 31 of the valve piston 22 to passage 32 which is open to brake cylinder passage 23. The emergency valve mechanism does not move in a service application of the brakes and the valve pistons 21 and 22 are maintained in their upper positions. The brake cylinder pressure may be increased in a service application by making further reductions in brake pipe pressure, the operation corresponding with that of an ordinary triple valve device.

In order to effect an emergency application of the brakes, a sudden reduction in brake pipe pressure is made and the equalizing piston is thus caused to move its full traverse, as shown in Fig. 2 of the drawings.

In this position, the slide valve 8 connects passage 12 through a cavity 33 with an exhaust port 34, so that fluid is vented from the emergency piston chamber 11. The pressure in valve chamber 14 then shifts the piston 10 to its outer position, in which the reservoir 17 is connected through passage 19, cavity 35 and passage 36 to the chamber above the valve piston 21 and the valve chamber 14 is connected by passage 37 with the chamber above the valve piston 22. The movement of the slide valve 8 uncovers passage 30, so that fluid from the auxiliary reservoir 7 can flow into said passage to the valve piston 22. Fluid admitted to the chambers above the respective valve pistons 21 and 22 causes the movement thereof to the lower seated positions, as shown in Fig. 2 of the drawings, and this permits fluid to flow from the reservoir 17 to the brake cylinder, a passage 38, leading to brake cylinder passage 23, being opened to the chamber above the valve piston 21 by the downward movement thereof. Communication from the other reservoirs 7 and 16 is now cut off and fluid continues to flow from the reservoir 17 to the brake cylinder until the pressures have substantially equalized, when the valve piston 21 moves back to its upper seat, cutting off communication from the reservoir 17 to the brake cylinder. In this position of the valve piston 21, communication is opened from passage 38 through annular chamber 39 to a passage 40 which opens to the chamber above valve piston 22, so that now, fluid can flow from the reservoir 16 to the brake cylinder, through passage 37, passage 40, chamber 39 and passage 38. When the pressure in reservoir 16 has substantially equalized into the brake cylinder, the valve piston 22 moves to its upper seat, cutting off communication from the reservoir 16 to the brake cylinder and opening communication from the auxiliary reservoir 7 to the brake cylinder through passage 30, annular chamber 31, passage 30, and passage 23, thus permitting the auxiliary reservoir to equalize into the brake cylinder. The brakes are released after an emergency application by increasing the brake pipe pressure, so that the equalizing piston 27 is returned to release position. In order to insure the movement of the emergency valve mechanism to release position, the same may be provided with a small piston head 41, the chamber at the back of which is constantly open to atmospheric pressure through a port 42. There is an equalizing port 43 through the piston 10 and when the passage 12 is blanked by the movement of slide valve 8 to release position, the fluid pressures on opposite sides of the piston 10 equalize through said port 43 and since the small piston 41 is subject to atmospheric pressure, the unbalanced pressure acting on a corresponding area of the piston 10 operates to return the emergency valve mechanism to release position.

It will now be seen that by means of the present construction, a high pressure may be obtained in the brake cylinder in an emergency application of the brakes by successively and separately equalizing the pressures of the three reservoirs into the brake cylinder.

Having now described my invention, what I claim as new and desire to secure by Letters Patent is:—

1. In a fluid pressure brake, the combination with a brake cylinder, of three sources of fluid under pressure and means for successively equalizing the pressures of said sources into the brake cylinder.

2. In a fluid pressure brake, the combination with a brake cylinder, of three sources of fluid under pressure and means operating upon equalization of the fluid pressure of one source into the brake cylinder for opening a second source to the brake cylinder and operating upon equalization of the second source into the brake cylinder for opening communication from the third source to the brake cylinder.

3. In a fluid pressure brake, the combination with a brake cylinder, of three sources of fluid under pressure and means operating upon equalization of the fluid pressure of one source into the brake cylinder for cutting off communication from said source to the brake cylinder and for opening communication from a second source to the brake cylinder and then operating upon equalization of the second source into the brake cylinder for cutting off communication from the second source to the brake cylinder and for opening communication from the third source to the brake cylinder.

4. In a fluid pressure brake, the combination with a brake cylinder and three sources of fluid under pressure, of a valve piston subject to the opposing pressures of one source and the brake cylinder for supplying fluid from said source to the brake cylinder and operating upon equalization of said source into the brake cylinder for cutting off communication from said source to the brake cylinder and for opening another brake cylinder passage, and a second valve piston subject to the opposing pressures of a second source and the brake cylinder for then supplying fluid from the second source through said brake cylinder passage to the brake cylinder and operating upon equalization of the second source into the brake cylinder for closing communication from the second source to the brake cylinder and for opening communication from the third source to the brake cylinder.

5. In a fluid pressure brake, the combination with a brake pipe, brake cylinder, and an equalizing valve device operated by variations in brake pipe pressure for controlling the brakes, of three sources of fluid under pressure, means for successively supplying fluid from said sources to the brake cylinder, and an emergency valve mechanism operated by said equalizing valve device upon a sudden reduction in brake pipe pressure for controlling the operation of said means.

6. In a fluid pressure brake, the combination with a brake pipe, a brake cylinder, and an equalizing valve device subject to variations in brake pipe pressure, of three sources of fluid under pressure, a valve piston for supplying fluid from one source to the brake cylinder in one position and from a second source in another position, a second valve piston for supplying fluid from the third source to the brake cylinder, and an emergency valve device for controlling the supply of fluid from two sources to said valve pistons, the supply from the third source being controlled by the equalizing valve device.

In testimony whereof I have hereunto set my hand.

WALTER V. TURNER.

Witnesses:
A. M. CLEMENTS,
BARBARA HERBERT.

Copies of this patent may be obtained for five cents each, by addressing the "Commissioner of Patents, Washington, D. C."